US012769081B2

(12) United States Patent
Li

(10) Patent No.: US 12,769,081 B2
(45) Date of Patent: Oct. 20, 2026

(54) LENS BARREL AND LENS MODULE

(71) Applicant: Changzhou AAC Raytech Optronics Co., Ltd., Changzhou City (CN)

(72) Inventor: Fan Li, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 321 days.

(21) Appl. No.: 18/536,279

(22) Filed: Dec. 12, 2023

(65) Prior Publication Data

US 2025/0035879 A1 Jan. 30, 2025

Related U.S. Application Data

(63) Continuation of application No. PCT/CN2023/109977, filed on Jul. 28, 2023.

(51) Int. Cl.
*G02B 7/02* (2021.01)

(52) U.S. Cl.
CPC .................................... *G02B 7/02* (2013.01)

(58) Field of Classification Search
CPC .......... G02B 7/02; G02B 7/021; G02B 7/003; G02B 7/20; G02B 7/028; G02B 5/006; G02B 27/0006; G02B 27/32
See application file for complete search history.

(56) References Cited

FOREIGN PATENT DOCUMENTS

CN 206431351 U * 8/2017

OTHER PUBLICATIONS

Original and machine translation of CN206431351 (Year: 2017).*

* cited by examiner

*Primary Examiner* — Travis S Fissel
(74) *Attorney, Agent, or Firm* — Wiersch Law Group

(57) ABSTRACT

A lens barrel is provided, including: a lens barrel body which is hollow and open at both ends, and a support wall bending and extending inwardly from an object-side end of the lens barrel body and enclosing a light-through hole. An image-side surface of the support wall is provided with extinction regions spaced apart from each other along a circumferential direction of the support wall. Each extinction region includes linear extinction strips protruding from the image-side surface, and the linear extinction strips are all disposed in each extinction region. Each linear extinction strip extends from one end of the image-side surface of the support wall adjacent to the lens barrel body to one end thereof adjacent to the optical axis, and adjacent two linear extinction strips are spaced apart from each other to form a vent slot. The lens barrel and lens module of the present disclosure are more reliable.

6 Claims, 5 Drawing Sheets

B-B

LENS BARREL AND LENS MODULE

CROSS-REFERENCE TO RELATED APPLICATION

The present application is a continuation of PCT Patent Application No. PCT/CN2023/109977, filed Jul. 28, 2023, which is incorporated by reference herein in its entirety.

TECHNICAL FIELD

The present disclosure relates to the field of optical imaging, and more particularly to a lens barrel and a lens module applied in photographic camera products.

BACKGROUND

With continuous development of science and technology, optical lens modules are widely used in the field of consumer digital products, e.g., cell phones, notebook computers, and toys, industrial detection, automotive cameras, medical fields, etc. With the development of imaging technology and widespread use of electronic products with camera functions, optical lens module components are widely used in various fields of life.

A lens module in the related technology includes a lens barrel having an accommodation space and a lens group accommodated in a lens barrel body, the lens barrel includes the lens barrel body having the accommodation space, and a support wall bending and extending inwardly from an object-side end of the lens barrel body and enclosing a light-through hole.

However, since an image-side surface of the support wall is planar and an object-side surface of the lens group is also planar in the related technology, when the object-side surface of the lens group is abutted against the image-side surface of the support wall, the two of them are adhered together to create a sealing effect, so that gases inside the lens barrel are unable to be discharged after a high temperature and high humidity experiment, which in turn causes change in air gaps of the lens group, i.e., change in an axial spacing between neighboring lenses in the lens group, and thus leads to instability of field curvature and peak of the image of the lens module, resulting in performance failure and poor reliability.

Therefore, it is necessary to provide a new lens barrel and lens module to solve the above technical problems.

SUMMARY

The present disclosure aims to provide a lens module to solve the problem that the gases inside the lens barrel are unable to be discharged in a high temperature and high humidity environment thus causing change in the air gap and leading to performance failure.

In a first aspect, the present disclosure provides a lens barrel, including: a lens barrel body which is hollow and open at both ends, and a support wall bending and extending inwardly from an object-side end of the lens barrel body and enclosing a light-through hole, where an image-side surface of the support wall is provided with a plurality of extinction regions protruding in a direction of an optical axis of the lens barrel, and the plurality of extinction regions are spaced apart from each other along a circumferential direction of the support wall; where each of the plurality of extinction regions includes a plurality of linear extinction strips protruding from the image-side surface, and the plurality of linear extinction strips are all disposed in each of the plurality of extinction regions; and where each of the plurality of linear extinction strips extends from one end of the image-side surface of the support wall adjacent to the lens barrel body to one end of the image-side surface of the support wall adjacent to the optical axis, and adjacent two linear extinction strips are spaced apart from each other to form a vent slot for venting.

As an improvement, the vent slot has a width in a range of 10 μm to 30 μm.

As an improvement, the vent slot has a slot depth in a range of 2 μm to 10 μm.

As an improvement, a linear scanning extinction roughness Rt of each of the plurality of extinction regions is in a range of 1 μm to 10 μm.

As an improvement, four extinction regions are provided and are equally spaced apart.

As an improvement, a number of the plurality of linear extinction strips in each of the plurality of extinction regions is 70, and a size of a spacing region between adjacent two extinction regions is half a size of a single extinction region.

In a second aspect, the present disclosure further provides a lens module, including the lens barrel described in any one of the above embodiments and a lens group mounted in the lens barrel, where an object-side surface of the lens group is abutted against the plurality of extinction regions.

Compared with the related technology, in the lens barrel and the lens module of the present disclosure, the image-side surface of the support wall is provided with the plurality of extinction regions protruding in the direction of the optical axis of the lens barrel, and the plurality of extinction regions are spaced apart from each other along the circumferential direction of the support wall. Each extinction region includes the plurality of linear extinction strips protruding from the image-side surface, and each of the linear extinction strips is adjacent to the image side of the support wall. Each of the linear extinction strips extends from one end of the image-side surface of the support wall adjacent to the lens barrel body to one end of the image-side surface of the support wall adjacent to the optical axis, and adjacent two linear extinction strips are spaced apart from each other to form the vent slot for venting. With the design of the above structure, the gases inside the lens module are able to be discharged through the vent slots in the extinction regions in a high temperature and high humidity environment after the lens barrel is applied to the lens module. Meanwhile, the extinction region adopts the linear extinction treatment with mature technology, which effectively avoids the entry of external moisture into the interior of the lens barrel, thereby improving the reliability of the lens barrel and the lens module.

BRIEF DESCRIPTION OF THE DRAWINGS

To illustrate the technical solutions in the embodiments of the present disclosure more clearly, the accompanying drawings used for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The technical solutions in the embodiments of the present disclosure are described clearly and completely in the following with reference to the accompanying drawings in the embodiments of the present disclosure. Apparently, the described embodiments are only some but not all of the embodiments of the present disclosure. Based on the embodiments in the present disclosure, all other embodiments obtained by a person of ordinary skill in the field without creative efforts fall within the protection scope of the present disclosure.

Embodiment 1

Figure 1:
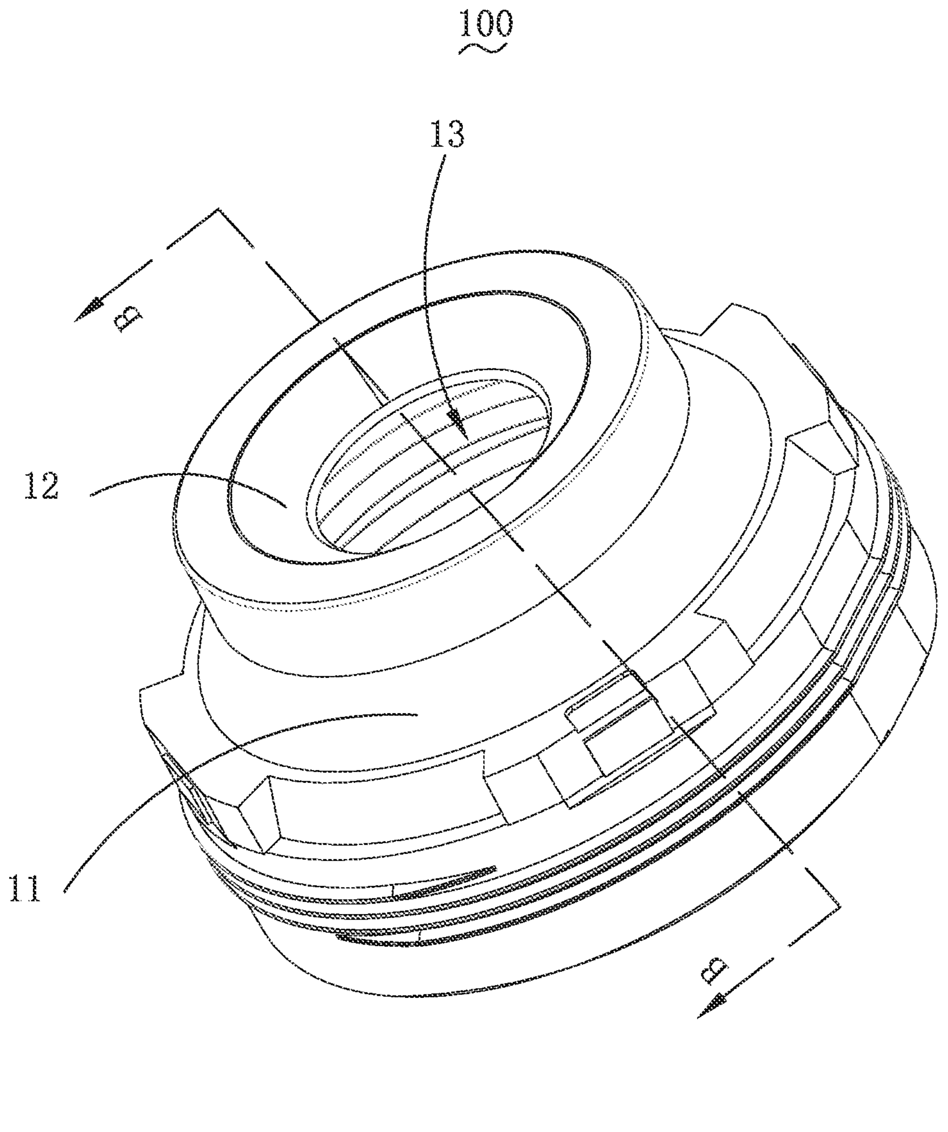
FIG. 1 shows a three-dimensional view of a lens barrel provided in an embodiment of the present disclosure.
Figure 2:
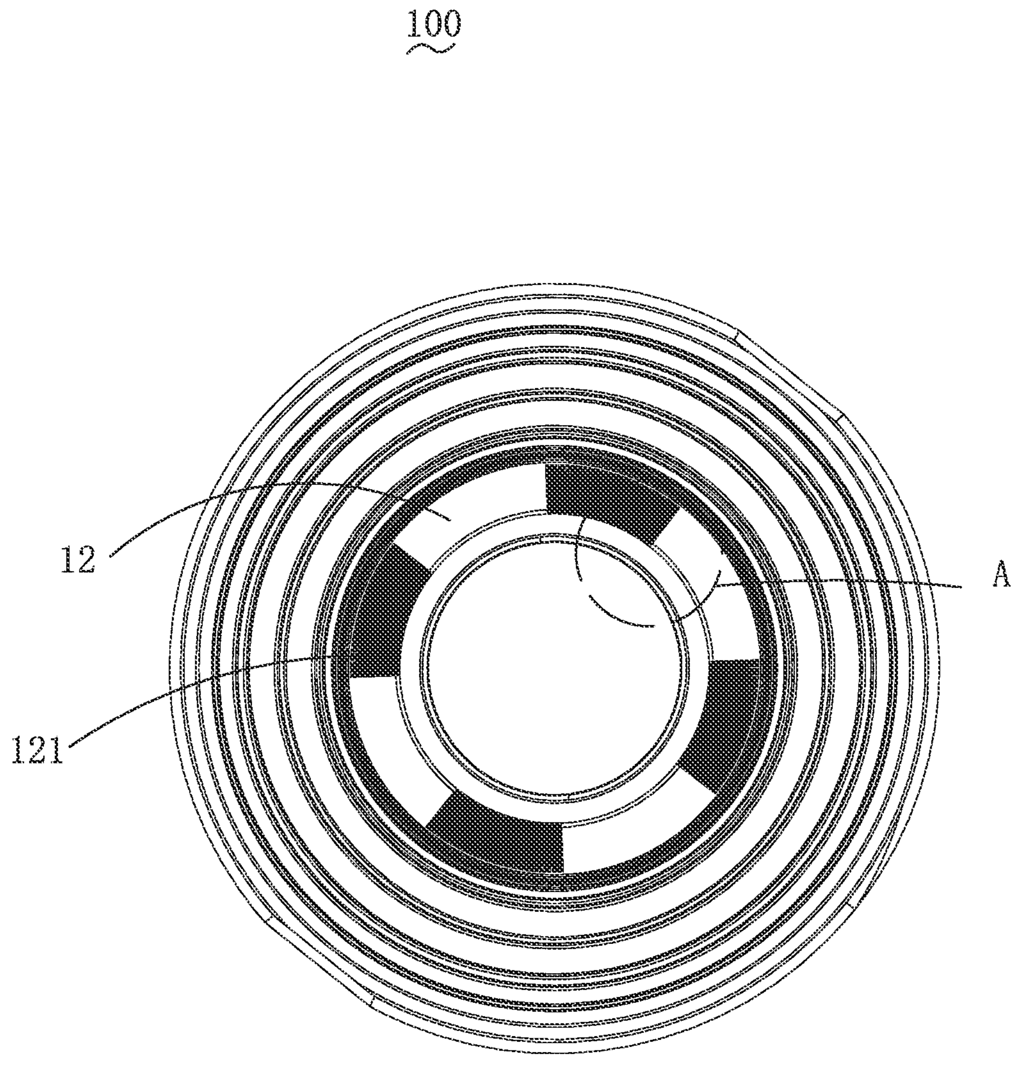
FIG. 2 shows a bottom view of a lens barrel provided in the embodiment of the present disclosure.
Figure 3:
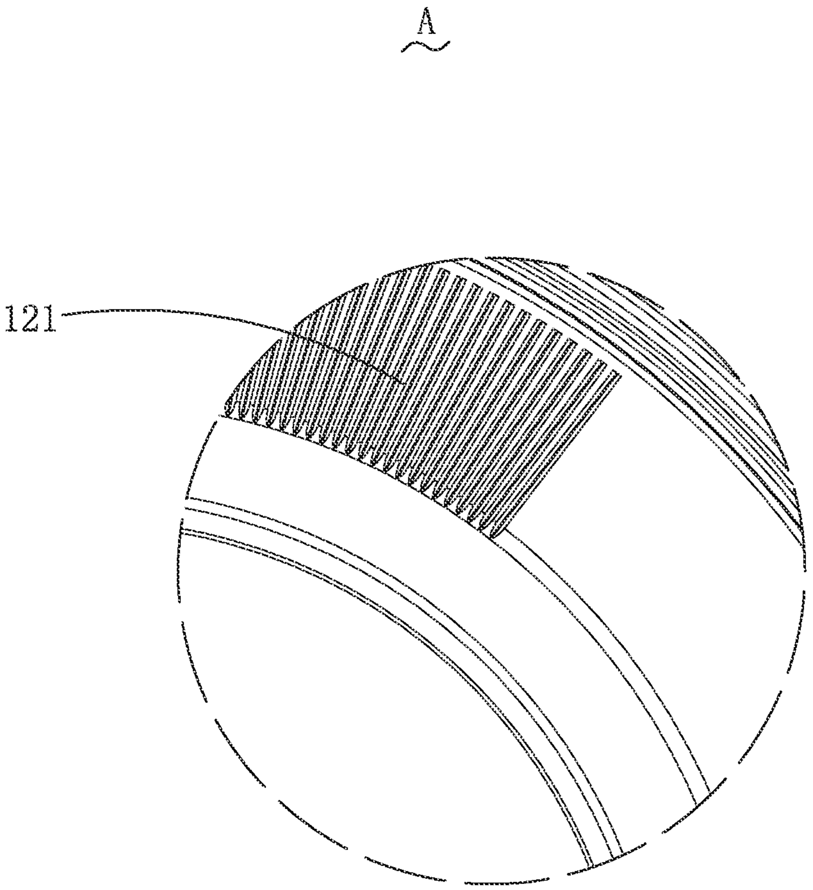
FIG. 3 shows a partially enlarged view of a portion A shown in FIG. 3.
Figure 4:
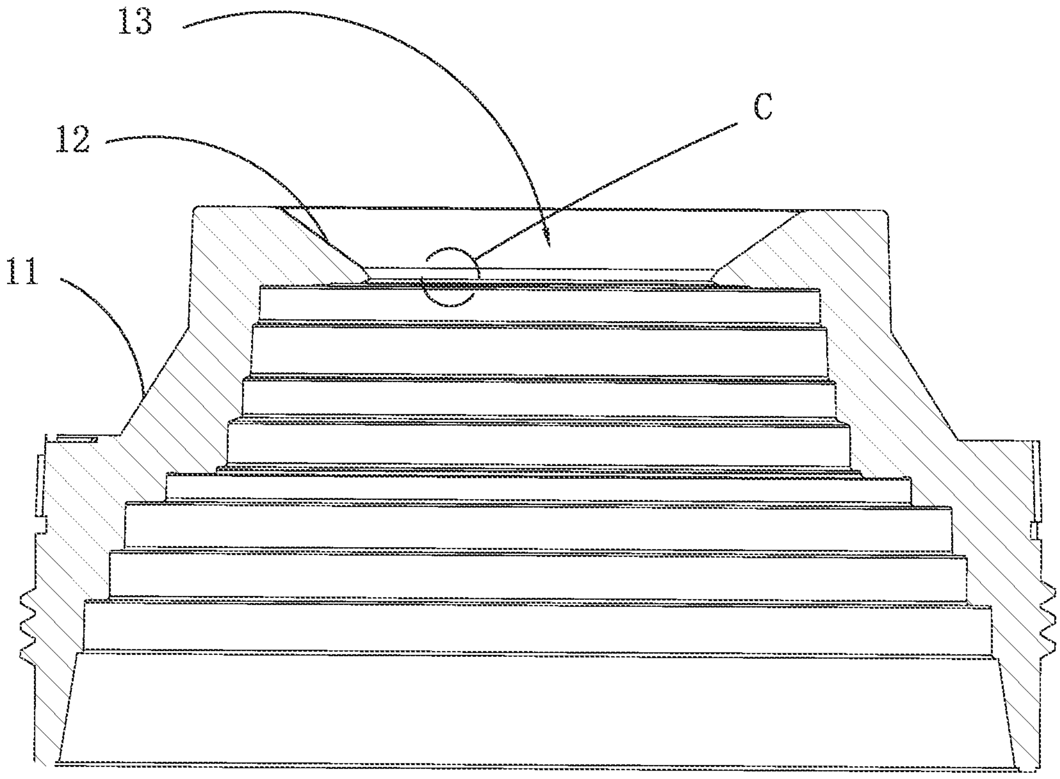
FIG. 4 shows a sectional view along line B-B in FIG. 1.
Figure 5:
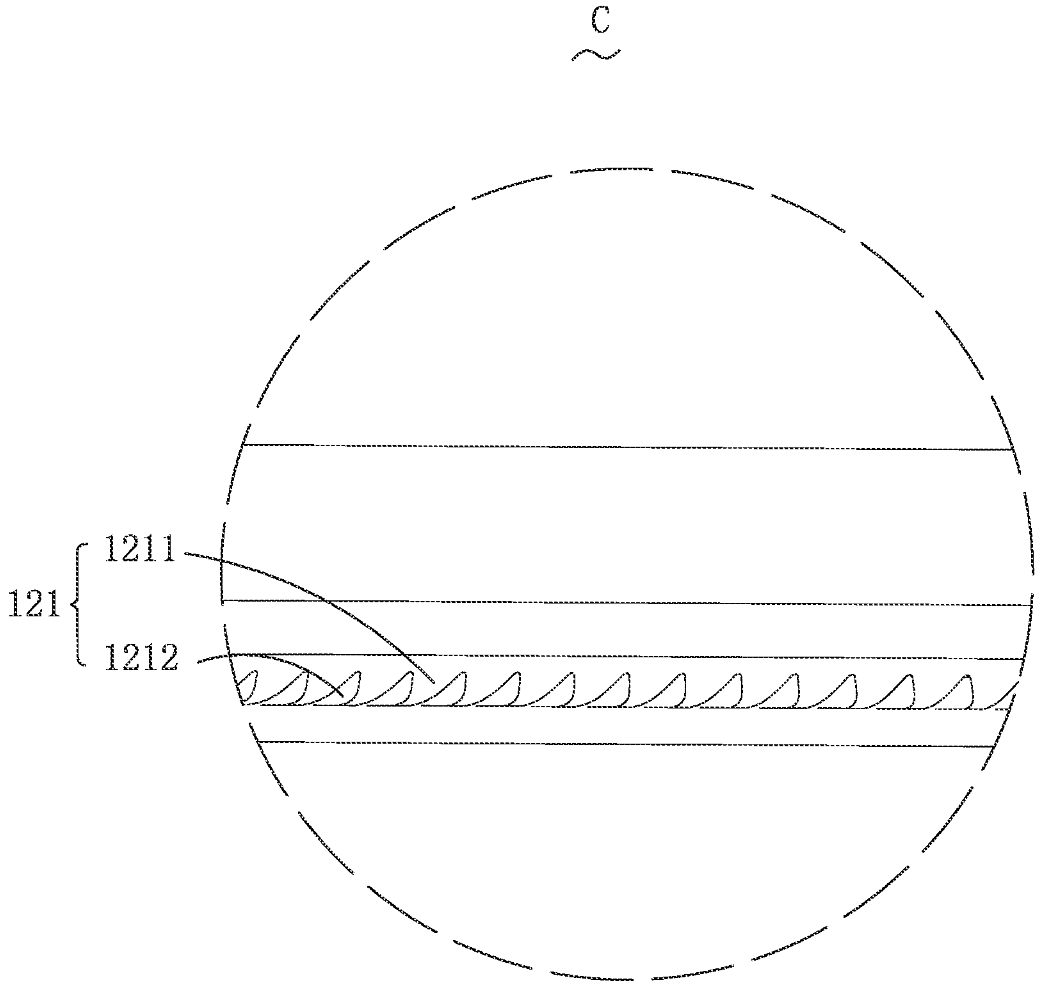
FIG. 5 shows a partially enlarged view of a portion C shown in FIG. 4.

Referring to FIG. 1 to FIG. 5, the present disclosure provides a lens barrel 100. The lens barrel 100 includes a lens barrel body 11 which is hollow and open at both ends, and a support wall 12 bending and extending inwardly from an object-side end of the lens barrel body 11 and enclosing a light-through hole 13.

An image-side surface of the support wall 12 is provided with a plurality of extinction regions 121 protruding in a direction of an optical axis of the lens barrel 100, and the plurality of extinction regions 121 are spaced apart from each other along a circumferential direction of the support wall 12.

A non-extinction region is formed between two adjacent extinction regions, and each extinction region 121 includes a plurality of linear extinction strips 1212 protruding from the image-side surface. The linear extinction strips 1212 are all disposed in the extinction regions 121, and each linear extinction strip 1212 extends from one end of the image-side surface of the support wall 12 adjacent to the lens barrel body 11 to one end of the image-side surface of the support wall 12 adjacent to the optical axis 13. Adjacent two linear extinction strips 1212 are spaced apart from each other to form a vent slot 1211 for venting. That is, each vent slot 1211 connects an outer peripheral edge of the image side of the support wall 12 with an inner peripheral edge of the image side of the support wall 12, for realizing venting. The arrangement of the linear extinction strips 1212 make their starting and ending positions are guaranteed to run through the image-side surface of the support wall 12, thereby ensuring smooth gas venting.

After the lens module is assembled in the lens barrel 100, when tested under high temperature and high humidity conditions, the gas in the lens barrel 100 flows along the vent slot 1211 to the light-through hole 13 and is emitted to the outside, thereby improving reliability of the lens module under high temperature and high humidity environments. Meanwhile, the extinction region adopts a linear extinction treatment in the form of the linear extinction strip with mature technology, which effectively avoids the entry of external moisture into interior of the lens barrel, thereby further improving the reliability.

The number of the linear extinction strips 1212, a range of the extinction, and a value of extinction roughness are able to be adjusted according to an actual size of the support wall 12. The larger the extinction region 121 is, the higher the flatness of the supporting obtained, and the less likely that extinction protrusions are collapsed after assembling, so that the stability is stronger.

In this embodiment, a width of the vent slot 1211 is in a range of 10 μm to 30 μm. The width of the vent slot 1211 is able to be adjusted according to actual situations. Preferably, the width of the vent slot 1211 is 20 μm. In this embodiment, a slot depth of the vent slot 1211 is in a range of 2 μm to 10 μm. The slot depth of the vent slot 1211 is able to be adjusted according to actual situations. Preferably, the slot depth of the vent slot 1211 is 3.56 μm.

In this embodiment, a linear scanning extinction roughness Rt of each extinction region 121 is in a range of 1 μm to 10 μm, and the roughness Rt refers to maximum peak and valley heights of the roughness within a contour evaluation length. Specifically, the roughness Rt ranges from 1 μm to 10 μm. This setting effectively ensures the flatness of the extinction region 121 and improves reliability. Preferably, the linear scanning extinction roughness Rt of the extinction region 121 is 6 μm.

In this embodiment, four extinction regions 121 are provided and are equally spaced apart. The number of the extinction regions 121 is not limited to four, other numbers such as two, three and five are feasible, and it is also feasible for the extinction regions 121 to cover the support wall 12 as a whole, and the number is able to be adjusted arbitrarily according to actual situations.

In this embodiment, the number of linear extinction strips 1212 in each extinction region 121 is 70, and a size of a single non-extinction region is half a size of a single extinction region. The number of the linear extinction strips 1212 in each extinction region 121 is not limited to 70, and a ratio between the size of the extinction region and the size of the non-extinction region is not limited to 2:1, which are able to be arbitrarily adjusted according to actual situations.

Embodiment 2

The present disclosure further provides a lens module. The lens module includes the lens barrel as described in Embodiment 1 and a lens group mounted in the lens barrel, and an object-side surface of the lens group is abutted against the extinction regions 121.

Table 1 indicates test results of the amount of change in the air gap before and after high temperature and high humidity experiments for the lens barrel and the lens module in the prior art which do not adopt the design of the extinction region.

TABLE 1

| | | P1 | AIR1 | P2 | AIR2 | P3 | AIR3 | P4 | AIR4 | P5 | AIR5 | P6 |
|---|---|---|---|---|---|---|---|---|---|---|---|---|
| Mount of change | 1 | 0.05 | −0.25 | 0.23 | −1.46 | −0.04 | 4.79 | 0.14 | 4.32 | 0.24 | 8.12 | −0.19 |
| | 2 | −0.09 | −0.23 | 0.22 | −1.36 | 0.07 | 4.05 | 0.34 | 3.98 | 0.10 | 7.54 | 0.13 |
| | 3 | 0.31 | −0.18 | 0.27 | −1.32 | 0.04 | 4.68 | 0.32 | 4.03 | 0.38 | 8.07 | 0.07 |
| | 4 | 0.11 | −0.51 | 0.12 | −1.35 | 0.10 | 5.29 | 0.50 | 3.95 | 0.23 | 8.39 | −0.21 |
| | 5 | 0.25 | −0.35 | 0.29 | −1.46 | 0.06 | 4.78 | −0.13 | 4.11 | 0.14 | 8.19 | 0.05 |

where P denotes lenses and AIR denotes the amount of change in the air gap.

It is seen from Table 1 that under a high temperature and high humidity environment, the amount of change in the air gap of the lens barrel and lens module not designed with the extinction region significantly increases beyond a normal range, resulting in problems in the performance of the lens barrel and lens module.

Specific test results of the amount of change in the air gap before and after the high temperature and high humidity experiment in Embodiment 1 and 2 of the present disclosure are shown below.

Table 2 indicates results of the amount of change in the air gap before and after the high temperature and high humidity experiment in Embodiments 1 and 2.

TABLE 2

| | | P1 | AIR1 | P2 | AIR2 | P3 | AIR3 | P4 | AIR4 | P5 | AIR5 | P6 |
|---|---|---|---|---|---|---|---|---|---|---|---|---|
| Mount of change | 1 | −0.13 | 0.05 | −0.09 | 0.01 | −0.10 | 0.05 | 0.21 | −0.14 | 0.03 | 0.19 | −0.09 |
| | 2 | 0.11 | −0.01 | 0.06 | 0.01 | 0.06 | −0.22 | 0.07 | 0.13 | −0.34 | 0.12 | 0.06 |
| | 3 | 0.09 | 0.63 | 0.15 | −0.99 | −0.06 | 0.44 | −0.09 | −0.82 | 0.06 | −0.23 | −0.18 |
| | 4 | −0.09 | 0.92 | 0.41 | −1.55 | 0.07 | 0.69 | 0.28 | −0.75 | 0.19 | −1.08 | 0.13 |
| | 5 | −0.37 | 0.89 | 0.39 | −0.62 | −0.16 | 0.81 | 0.14 | −0.93 | 0.34 | −0.96 | −0.02 |

According to the contents of Tables 1 and 2, it is seen that the amounts of changes in the air gap of the present disclosure before and after the high temperature and high humidity experiment are small and are all within the normal range. Accordingly, the present disclosure effectively solves the problem that the gases inside the lens barrel and lens module are unable to be discharged in a high temperature and high humidity environment, and improves the reliability of the lens barrel and lens module.

Compared with the related technology, in the lens barrel and the lens module of the present disclosure, the image-side surface of the support wall is provided with the plurality of extinction regions protruding in the direction of the optical axis of the lens barrel, and the plurality of extinction regions are spaced apart from each other along the circumferential direction of the support wall. Each extinction region includes the plurality of linear extinction strips protruding from the image-side surface, and each of the linear extinction strips is adjacent to the image side of the support wall. Each of the linear extinction strips extends from one end of the image-side surface of the support wall adjacent to the lens barrel body to one end of the image-side surface of the support wall adjacent to the optical axis, and adjacent two linear extinction strips are spaced apart from each other to form the vent slot for venting. With the design of the above structure, the gases inside the lens module are able to be discharged through the vent slots in the extinction regions in a high temperature and high humidity environment after the lens barrel is applied to the lens module. Meanwhile, the extinction region adopts the linear extinction treatment with mature technology, which effectively avoids the entry of external moisture into the interior of the lens barrel, thereby improving the reliability of the lens barrel and the lens module.

The above description is only the embodiments of the present disclosure, it should be noted that, for the person of ordinary skills in this field, improvements can also be obtained without departing from creation concepts of the present disclosure, which all belong to the protection scope of the present disclosure.

What is claimed is:

1. A lens barrel, comprising: a lens barrel body which is hollow and open at both ends, and a support wall bending and extending inwardly from an object-side end of the lens barrel body and enclosing a light-through hole, wherein an image-side surface of the support wall is provided with a plurality of extinction regions protruding in a direction of an optical axis of the lens barrel, and the plurality of extinction regions are spaced apart from each other along a circumferential direction of the support wall; wherein each of the plurality of extinction regions includes a plurality of linear extinction strips protruding from the image-side surface, and the plurality of linear extinction strips are all disposed in each of the plurality of extinction regions; and wherein each of the plurality of linear extinction strips extends from one end of the image-side surface of the support wall adjacent to the lens barrel body to one end of the image-side surface of the support wall adjacent to the optical axis, and adjacent two linear extinction strips are spaced apart from each other to form a vent slot for venting;

wherein the vent slot has a width in a range of 10 μm to 30 μm, the vent slot has a slot depth in a range of 2 μm to 10 μm, and a linear scanning extinction roughness Rt of each of the plurality of extinction regions is in a range of 1 μm to 10 μm.

2. The lens barrel according to claim 1, wherein four extinction regions are provided and are equally spaced apart.

3. The lens barrel according to claim 2, wherein a number of the plurality of linear extinction strips in each of the plurality of extinction regions is 70, and a size of a spacing region between adjacent two extinction regions is half a size of a single extinction region.

4. A lens module, comprising a lens barrel and a lens group mounted in the lens barrel, wherein the lens barrel includes a lens barrel body which is hollow and open at both ends, and a support wall bending and extending inwardly from an object-side end of the lens barrel body and enclosing a light-through hole; wherein an image-side surface of the support wall is provided with a plurality of extinction regions protruding in a direction of an optical axis of the lens barrel, and the plurality of extinction regions are spaced apart from each other along a circumferential direction of the support wall; wherein each of the plurality of extinction regions includes a plurality of linear extinction strips protruding from the image-side surface, and the plurality of linear extinction strips are all disposed in each of the plurality of extinction regions; wherein each of the plurality of linear extinction strips extends from one end of the image-side surface of the support wall adjacent to the lens barrel body to one end of the image-side surface of the support wall adjacent to the optical axis, and adjacent two linear extinction strips are spaced apart from each other to form a vent slot for venting; and wherein an object-side surface of the lens group is abutted against the plurality of extinction regions;

wherein the vent slot has a width in a range of 10 μm to 30 μm, the vent slot has a slot depth in a range of 2 μm to 10 μm, and a linear scanning extinction roughness Rt of each of the plurality of extinction regions is in a range of 1 μm to 10 μm.

5. The lens module according to claim 1, wherein four extinction regions are provided and are equally spaced apart.

6. The lens module according to claim 5, wherein a number of the plurality of linear extinction strips in each of the plurality of extinction regions is 70, and a size of a spacing region between adjacent two extinction regions is half a size of a single extinction region.

* * * * *